United States Patent [19]

Garrison

[11] 4,223,743
[45] Sep. 23, 1980

[54] FOLDABLE IMPLEMENT WITH RAISABLE TOOL ASSEMBLY

[75] Inventor: Harold K. Garrison, Newton, Kans.

[73] Assignee: Hesston Corporation, Hesston, Kans.

[21] Appl. No.: 914,076

[22] Filed: Jun. 9, 1978

[51] Int. Cl.³ .................. A01B 21/08; A01B 73/00
[52] U.S. Cl. .......................... 172/583; 172/311; 172/587
[58] Field of Search ............... 172/240, 310, 311, 456, 172/568, 569, 581, 583, 584, 585, 586, 587, 645, 646, 649, 650, 655, 656; 280/411 R, 411 A, 411 B, 411 C, 412, 413, 656; 56/228, 385

[56] References Cited

U.S. PATENT DOCUMENTS

| | | | |
|---|---|---|---|
| 3,606,848 | 9/1971 | Dobbs et al. | 172/311 X |
| 4,042,044 | 8/1977 | Honnold | 172/311 |
| 4,117,892 | 10/1978 | Dietrich, Sr. et al. | 172/311 |
| 4,128,131 | 12/1978 | Bucher et al. | 172/311 |

FOREIGN PATENT DOCUMENTS 442761  5/1975  U.S.S.R. .................................. 172/311

Primary Examiner—Richard T. Stouffer
Attorney, Agent, or Firm—Schmidt, Johnson, Hovey & Williams

[57] ABSTRACT

A folding implement has a pair of oppositely, laterally projecting tool beams which pivot about vertical axes between wide-spread, working positions and fold-back, transport positions in which the beams are substantially parallel to the path of travel of the implement. A secondary tool assembly situated behind the primary tool beams can swing about a transverse horizontal axis between a fully raised position for transport and a fully lowered position for working the ground. Push rod structure interconnects the secondary assembly with the primary beams so that as the primary beams are swung back to their transport positions, the secondary assembly is raised to its upper position, and conversely, as the primary beams are swung forwardly into their working positions, the secondary assembly is lowered into its ground-engaging position.

9 Claims, 7 Drawing Figures

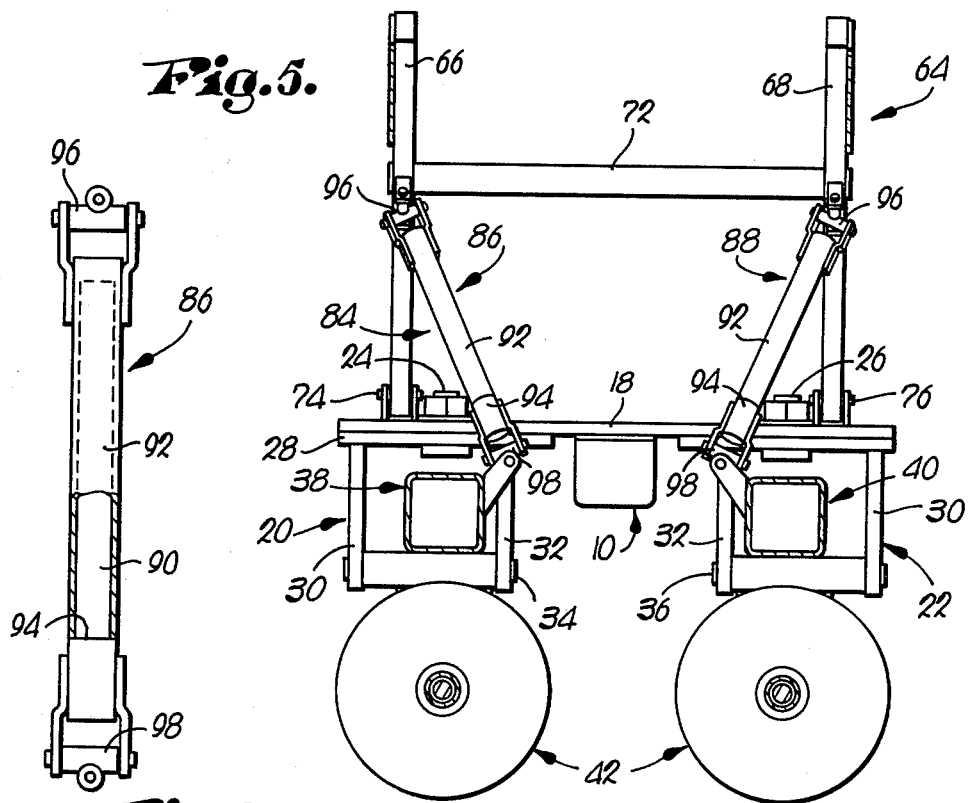
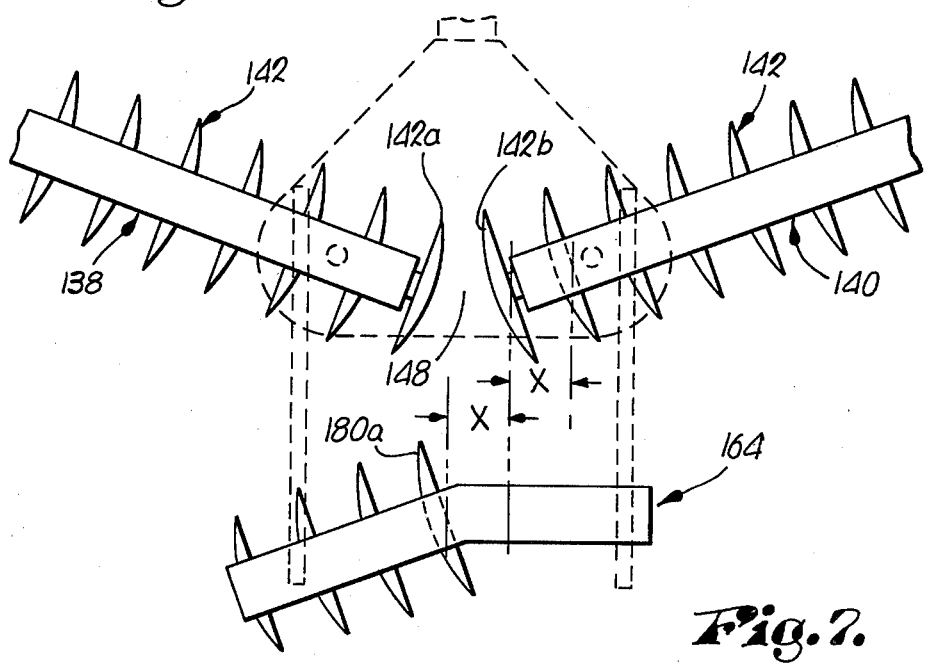

FOLDABLE IMPLEMENT WITH RAISABLE TOOL ASSEMBLY

TECHNICAL FIELD

This invention relates to agricultural implements and, more particularly, to a folding implement which can be placed in a laterally widespread condition for working the soil or folded into a more compacted condition for passage through farm gates and travel along the open road.

BACKGROUND ART

The present invention is especially useful in connection with a folding implement as shown and claimed in copending application for U.S. patent Ser. No. 825,903, filed Aug. 19, 1977, now abandoned, as a continuation of Ser. No. 690,945 filed May 28, 1976, now abandoned in the names of Adee, et al., titled "Fold-Back Implement Frame Having Angle Adjustment," and assigned to the assignee of the present invention.

The implement as set forth in said copending application has a pair of long beams which project in opposite lateral directions from the central fore-and-aft tongue or frame of the implement when the beams are in their normal working positions. Each of these beams carries a gang of discs which are disposed directly below the beam and extend parallel thereto. The two beams are attached to the frame by a pair of vertical pivots spaced a short distance apart on opposite sides of the longitudinal axis of the frame, and portions of the beams and discs project inwardly beyond the pivots such that the innermost discs of the two beams are disposed in close proximity to one another adjacent the center line of the implement.

Although such innermost discs are close to one another, nonetheless there must be a gap provided therebetween in order to permit the beams to swing through a greater-than-90 degree arc from their working positions in which they are angled slightly forwardly to their transport positions in which they are swung completely rearwardly into substantial parallelism with the path of travel of the implement.

While the gap thus presented between the two innermost discs is essential from the standpoint of swingability of the beams, this means that a strip of soil along the center line of the implement corresponding to the size of the gap will be left untouched by the discs during ground working operations by the implement. Hence, it is desirable to provide an additional or secondary set of ground working tools behind the primary discs for the purpose of working the strip of soil left by the primary tools. Yet it is essential that the secondary tools be shiftable into transport positions out of the ground when necessary.

SUMMARY OF THE INVENTION

According to the present invention, a way of lifting the secondary tools out of the ground and into a transportable position is provided which takes advantage of movement of the primary tool beams to their transport position and utilizes such movement of the primary beams to effect the corresponding movement of the secondary assembly. The secondary assembly is attached to the frame of the implement by a transverse horizontal pivot so that the assembly can swing up and down between its extreme positions. Push rods interconnect the primary beams and the assembly so that, as the primary beams swing rearwardly into the transport position, the push rods transmit this motion to the assembly and raise it up out of the ground. As long as the primary beams remain in their transport positions, the push rods are operable to maintain the assembly raised, but as soon as the primary beams begin to swing forwardly as the operator prepares the implement for field work, the push rods swing with the primary beams and allow the assembly to swing down to its ground-engaging position. There is one push rod for each primary beam, and both rods are extensible so that any variation in the otherwise simultaneous swinging of the beams between their positions can be readily accommodated by the extensible rods. Moreover, if the trailing secondary assembly encounters a rise in the terrain already experienced by the primary beams in advance thereof, the secondary assembly can readily rise up and over the terrain change as the push rods extend.

BRIEF DESCRIPTION OF THE DRAWINGS

FIG. 5 is an enlarged, fragmentary cross-sectional view of the implement when in its transport condition and taken substantially along line 5—5 of FIG. 4;

FIG. 6 is an enlarged, plan view of one of the push rods, a portion of such rod being broken away to reveal its extensible or telescopic nature; and FIG. 7 is a schematic plan view of the rear of the implement showing a modified arrangement for working the center strip of soil left untouched by the innermost discs of the primary gangs.

DETAILED DESCRIPTION

Figure 1:
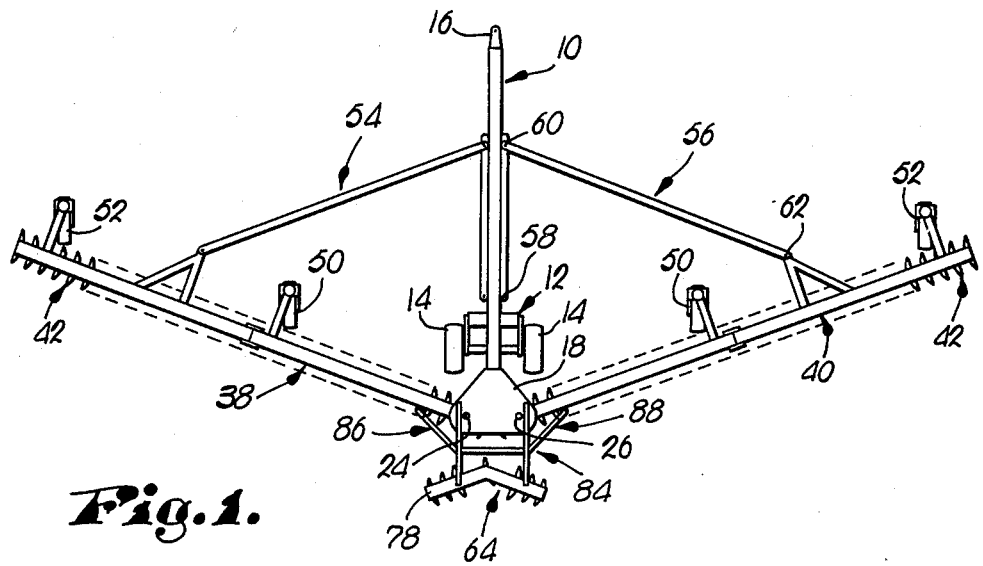
FIG. 1 is a top plan view of a folding implement constructed in accordance with the principles of the present invention.

The implement has a central fore-and-aft extending tongue or frame 10 supported for over-the-ground travel by a wheel assembly 12 having ground-engaging wheels 14 that may be raised and lowered hydraulically by means not shown. The front of the frame 10 is provided with a clevis 16 for hitching the implement to a towing vehicle (not shown) and the rear of the frame 10 is provided with a triangular plate 18 disposed symmetrically with respect to the longitudinal axis of the implement.

The plate 18 supports a pair of depending yokes 20 and 22 that are connected to the plate 18 via a pair of vertical pivots 24 and 26 such that the yokes 20 and 22 can swivel about the vertical axis defined by the pivots 24 and 26. Each of the yokes 20, 22 has a circular turntable 28 disposed slidably against the lower surface of the plate 18 and a pair of spaced-apart lugs 30 and 32 depending rigidly from the turn-table 28 for rotation with the latter about the pivot 24 or 26.

Figure 2:
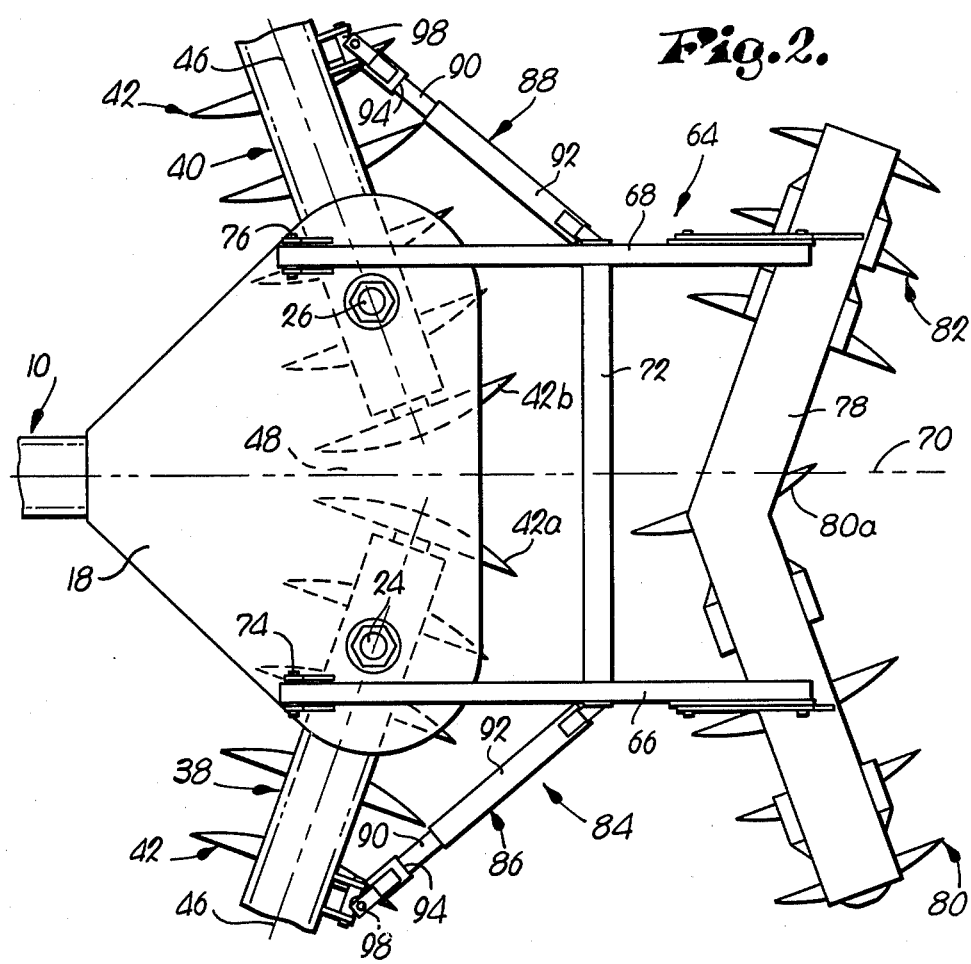
FIG. 2 is an enlarged, fragmentary top plan view of the rear portion of the implement.

The yokes 20 and 22 have horizontal pivots 34 and 36 respectively that connect a pair of long primary beams 38 and 40 with the yokes 20 and 22 for vertical swinging movement about the horizontal axes of the pivots 34 and 36. Each of the beams 38 and 40 has a gang of ground-working discs 42 supported beneath the same via depending struts such as the strut 44 shown in FIG. 4. The discs 42 are aligned for rotation about a common axis defined generally by the numeral 46 in FIG. 4, said axis 46 being in vertical alignment with and parallel to the longitudinal axis of the corresponding beam 38 or 40. As illustrated in FIG. 2, the axis 46 of each gang of discs 42 intersects the vertical axis of the corresponding vertical pivot 24 or 26.

Figure 4:
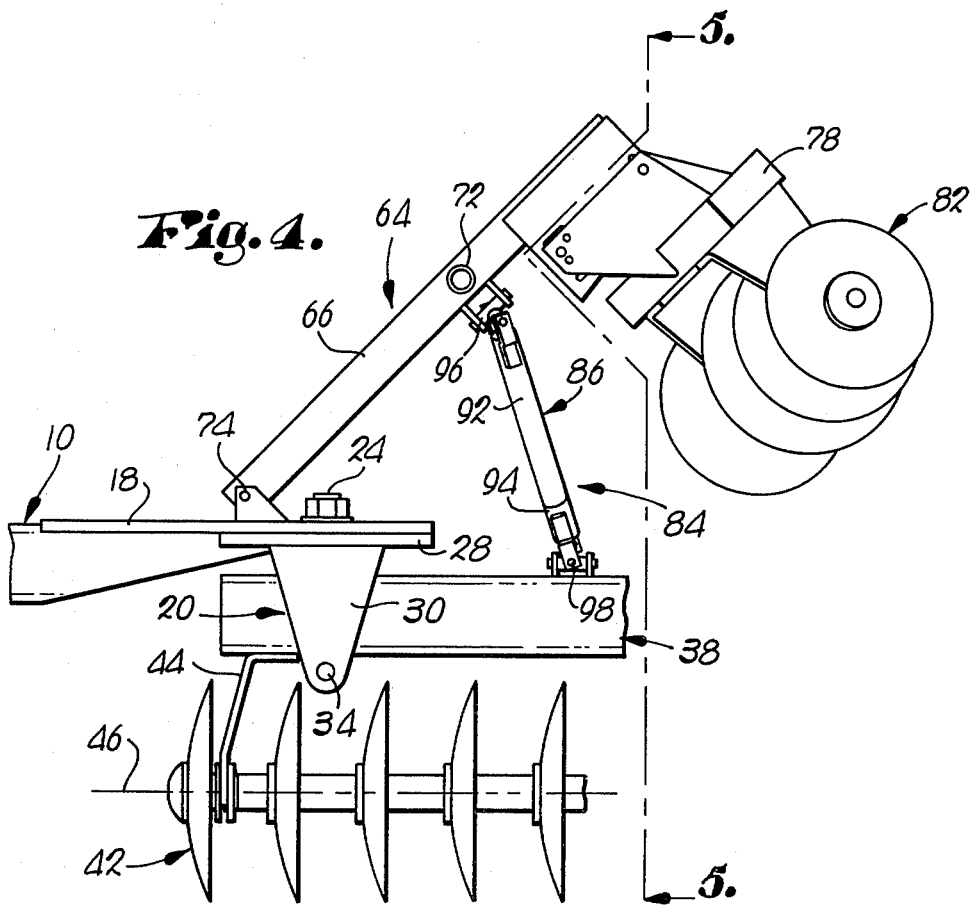
FIG. 4 is a side elevational view of the implement similar to FIG. 3 but showing the primary tool beams folded back and the secondary assembly fully raised.

The vertical pivots 24 and 26 adapt the primary beams 38 and 40 for horizontal swinging movement between widespread, slightly forwardly angled working positions as illustrated in FIGS. 1 and 2, and folded back, laterally compacted positions in which the beams 38 and 40 are substantially parallel to the path of travel of the implement as illustrated for example in FIGS. 4 and 5. Note in FIG. 2 that although the beams 38 and 40 project inwardly beyond their corresponding vertical pivots 24 and 26 when the beams 38 and 40 are in their working positions, there is a gap denoted by the numeral 48 between the innermost discs 42a and 42b of the gangs 42. This permits the greater-than-90 degree swinging arc that is required by the beams 38 and 40 during swinging between their two extreme positions without causing the innermost discs 42a and 42b to strike one another during such swinging.

Caster Wheels 50 and 52 for each beam 38 and 40 support the latter for over-the-ground travel and have hydraulic means (not disclosed) associated therewith for lifting of the beams 38 and 40 above the ground simultaneously with raising of the frame 10 by its hydraulic beams (not shown). Folding elbow linkages 54 and 56 on opposite sides of the frame 10 retain the beams 38 and 40 in their working positions but may be released by means not shown so as to permit the beams 38 and 40 to fold rearwardly. The innermost end of each linkage 54 or 56 has a rearwardly disposed pivot 58 with the frame 10, a middle joint 60, and an outer pivot 62 that joins the linkage 54 or 56 with the corresponding beam 38 or 40.

A secondary assembly broadly denoted by the numeral 64 is supported on the frame 10 generally rearwardly of the primary beams 38 and 40. Assembly 64 includes a pair of arms 66 and 68 which extend in a fore-and-aft direction in parallelism with the center line 70 of the frame 10 and on laterally opposite sides thereof. The arms 66 and 68 are equally spaced from the center line 70 and are rigidified by a transverse brace 72. The forward ends of the arms 66 and 68 are pivotally connected to the plate 18 via individual, transversely extending horizontal pivots 74 and 76, said pivots 74 and 76 being axially aligned and disposed a short distance in front of the two vertical pivots 24 and 26.

A shallow, generally V-shaped beam 78 is attached to the rear ends of the arms 66 and 68 with its apex pointing forwardly. Two sets of aligned discs 80 and 82 are supported by the beam 78 so as to converge their axes of rotation toward the center line 70 of the implement. As illustrated in FIG. 2, the innermost disc 80a of the set 80 is situated in alignment with the gap 48 between the discs 42a and 42b of the beams 38 and 40.

Figure 3:
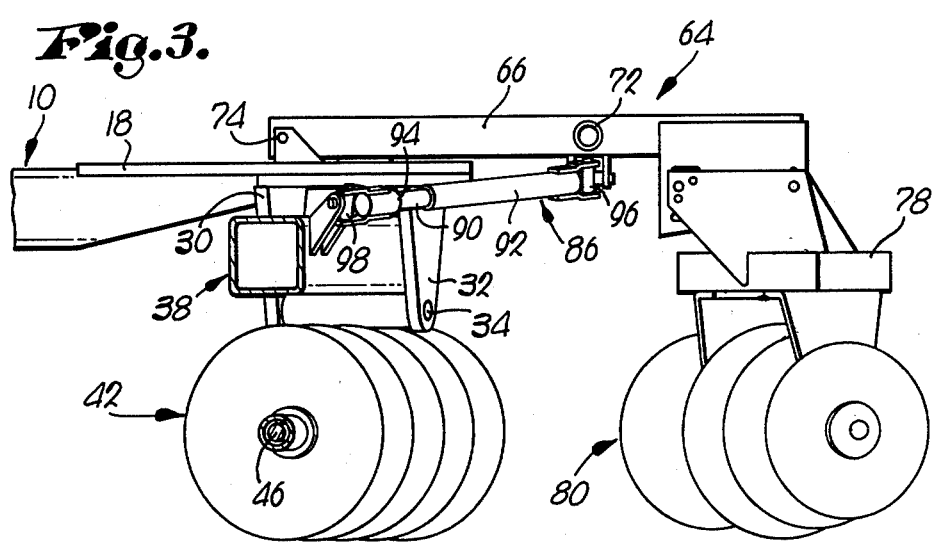
FIG. 3 is an enlarged, fragmentary side elevational view of the implement with the outer end of the nearest primary beam and discs gang broken away to reveal details of construction.

The assembly 64 is swingable about the transverse pivots 74 and 76 between the lowered position of FIG. 3 and the raised position of FIG. 4. Structure broadly denoted by the numeral 84 is operable in response to rearward swinging of the beams 38 and 40 to raise the assembly 64 toward said upper position thereof and is operable in response to forward swinging of the beams 38 and 40 to gradually lower the assembly 64 down to its ground-engaging position. Such structure 84 includes a pair of push rods 86 and 88, the rod 86 interconnecting the beam 38 and the arm 66, while the rod 88 interconnects the beam 40 and the arm 68. The push rods 86 and 88 are identical in construction, and using the rod 86 as an example, it may be seen as in FIG. 6 that the rod 86 is extensible, comprising an inner shank portion 90 and an outer housing portion 92 telescopically receiving the shank portion 90. A shoulder 94 at one end of the shank portion 90 provides a limit stop for the housing portion 92 such that the minimum compressible length of the rod 86 is achieved when the housing portion 92 abuts the shoulder 94. A universal joint 96 at the opposite end of the housing portion 92 is adapted for connection to the arm 66, while a second universal joint 98 at the shoulder end of the shank portion 90 is adapted for connecting the rod 86 with the beam 38.

OPERATION

When the implement is in its ground-working condition as illustrated in FIG. 1, all of the wheels 14, 50, and 52 may be raised such as to place the various discs 42, 80 and 82 in the ground. As the implement is pulled forwardly the discs 42 associated with beams 38 and 40 work the soil all the along the length of the beams 38 and 40 but leave a ridge of unworked soil corresponding in width to the width of the gap 48 between innermost discs 42a and 42b. Soil engaged by such innermost discs 42a and 42b is thrown outwardly with respect to the center line 70 of the implement.

However, by virtue of the presence of a secondary assembly 64, and particularly the disc 80a thereof, the ridge left by discs 42a and 42b is worked by the disc 80a and the soil therefrom is thrown toward the opposite side of the center line 70 where it is partially worked again by the discs 82.

As shown clearly in FIG. 2, the push rods 86 and 88 are slightly extended at this time. Hence, if the trailing discs 80 and 82 should happen to encounter a rise in the terrain, the assembly 64 can readily accommodate such rise as the rods 86 and 88 are extended. Likewise, if the assembly 64 should need to drop down slightly, this is readily permitted by the rods 86 and 88 as they compress to the extent necessary. Similarly, if the implement should encounter terrain variations from side-to-side such that one of the beams 38 or 40 wants to rise relative to the other, the extensibility of the rods 86 and 88 permits such differential movement without structural damage to the rods 86 and 88.

When the operator wishes to place the implement in a transport mode, he simply releases the latch means (not shown) holding the linkages 54 and 56 against the frame 10 so that upon forward movement of the frame 10, the engagement of the discs 42 with the ground causes the beams 38 and 40 to swing rearwardly about the vertical pivots 24 and 26. As such rearward swinging continues, any lost motion in the rods 86 and 88 as a result of their extended conditions is used up so that the housing portions 92 thereof come to rest against the shoulders 94. From that point on, further rearward swinging of the beams 38 and 40 transmits a lifting force to the assembly 64 through the push rods 86 and 88 to such an extent that the assembly 64 is raised about the pivots 74 and 76 until such time as the beams 38 and 40 are fully folded back, whereupon the assembly is fully raised as shown in FIG. 4. So long as the beams 38 and 40 remains folded back, the shoulders 94 associated with rods 86 and 88 will maintain the assembly 64 fully raised.

It is not necessarily true that both of the beams 38 and 40 will swing rearwardly at the same speed. Thus, if the beam 40 should lag behind, for example, beam 38 will continue through rod 86 to push the assembly 64 up to its raised position, the rod 88 simple extending as necessary during this time to accommodate the slower-moving beam 40. Eventually, of course, the beam 40 will catch up and the load of the assembly 64 will once again be shared equally by both rods 86 and 88. During swinging of the assembly 64, the universal joints 96 and 98 accommodate the skewed dispositions of the rods 86 and 88 and yet are fully functional to transmit compressive force as required to support the assembly 64.

Placing the implement in its ground-working mode is a simple reversal of the above procedure. By pushing the frame 10 rearwardly while the discs 42 remain engaged with the ground, the reaction force causes the arms 38 and 40 to swing forwardly about pivots 24 and 26 toward their working positions of FIG. 1. As the beams 38 and 40 move, the push rods 86 and 88 swing laterally outwardly from their positions illustrated in FIG. 5 and then begin to permit assembly 64 to descend by gravity as the beams 38 and 40 continue forwardly. Finally, when the assembly 64 reaches the ground, the beams 38 and 40 continue forwardly for a short distance so as to slightly extend the rods 86 and 88.

FIG. 7 illustrates a slight variation on the principles disclosed with respect to FIGS. 1–6. In FIG. 7 the innermost disc 142a of the beam 138 is slightly smaller in diameter than the opposed innermost disc 142b associated with the opposite beam 140. This means that the disc 142a will dig in slightly less deeply than the disc 142b.

The assembly 164 has a disc 180a the same diameter as the disc 142b and disposed in rearward alignment with the gap 148 so as to work the ridge left by the discs 142a and 142b. Although the disc 180a is part of the assembly 164 instead of on the beam 140, note that disc 180a is spaced from the disc 142b the same distance X as the distance between the various discs 142 along the beam 140. The axis of rotation of the disc 180a is parallel to the common axes of rotation of the discs 142. This arrangement provides for improved working of the ridge left by the gap 148 plus better smoothing of the soil in connection with said working.

I claim:

1. In a folding implement provided with a pair of tool supporting beams swingable horizontally on a frame of the implement between laterally oppositely extending working positions and generally fore-and-aft extending transport positions with respect to the normal path of travel of the implement, the improvement comprising:
   a tool assembly mounted on the frame for vertical swinging movement between raised and lowered positions; and
   structure operatively coupling said beams with said assembly and responsive to swinging of the beams between said positions thereof to raise the assembly to said raised position each time the beams are swung to said transport positions and to lower the assembly to said lowered position each time the beams are swung to said working positions.

2. In a folding implement provided with a pair of tool supporting beams swingable horizontally on a frame of the implement between laterally oppositely extending working positions and generally fore-and-aft extending transport positions with respect to the normal path of travel of the implement, the improvement comprising:
   a tool assembly mounted on the frame for vertical swinging movement between raised and lowered positions; and
   structure for raising said assembly to said raised position in response to swinging of the beams to said transport positions and for lowering said assembly to said lowered position in response to swinging of the beams to said working positions,
   said structure including at least one push rod between at least one of the beams and the assembly,
   said push rod being provided with a pair of universal joints at its opposite ends.

3. In a folding implement as claimed in claim 2, wherein said push rod is extensible, but is incompressible beyond a predetermined minimum length.

4. In a folding implement provided with a pair of tool supporting beams swingable horizontally on a frame of the implement between laterally oppositely extending working positions and generally fore-and-aft extending transport positions with respect to the normal path of travel of the implement, the improvement comprising:
   a tool assembly mounted on the frame for vertical swinging movement between raised and lowered positions; and
   structure for raising said assembly to said raised position in response to swinging of the beams to said transport positions and for lowering said assembly to said lowered position in response to swinging of the beams to said working positions,
   said structure including a pair of push rods each connected at one end to a corresponding one of said beams and at the opposite end to said assembly.

5. In a folding implement as claimed in claim 4, wherein each of said push rods is extensible but is compressible beyond a predetermined minimum length.

6. In a folding implement as claimed in claim 5, wherein each of said push rods has a pair of universal joints at its opposite ends.

7. In a folding implement provided with a pair of tool supporting beams swingable horizontally on a frame of the implement between laterally oppositely extending working positions and generally fore-and-aft extending transport positions with respect to the normal path of travel of the implement, the improvement comprising:
   a tool assembly mounted on the frame for vertical swinging movement between raised and lowered positions; and
   structure for raising said assembly to said raised position in response to swinging of the beams to said transport positions and for lowering said assembly to said lowered position in response to swinging of the beams to said working positions,
   said beams converging toward the center of the implement when the beams are in their working positions, said assembly being located directly behind the point of convergence of the beams with respect to the path of travel of the implement.

8. In a folding implement as claimed in claim 7, wherein said beams support ground working tools that tend to throw their worked ground in a first direction with respect to the line of travel of said point of convergence, said assembly supporting ground working tools that tend to throw their worked ground in a second direction that is opposite to said first direction.

9. In a folding implement as claimed in claim 8, wherein said first direction is outwardly away from said line of travel and said second direction is inwardly toward said line of travel.

* * * * *